UNITED STATES PATENT OFFICE.

ROBERT GNEHM AND JAKOB SCHMID, OF BASLE, SWITZERLAND, ASSIGNORS TO DR. FR. VON HEYDEN NACHFOLGER, OF RADEBEUL, GERMANY.

CARBONIC-ACID COMPOUND OF META-AMIDOPHENOL.

SPECIFICATION forming part of Letters Patent No. 427,564, dated May 13, 1890.

Application filed August 16, 1889. Serial No. 320,995. (Specimens.)

*To all whom it may concern:*

Be it known that we, ROBERT GNEHM and JAKOB SCHMID, citizens of Switzerland, residing at Basle, Switzerland, have invented new and useful Improvements in the Production of the Carbonic-Acid Compound of Meta-amidophenol, which may be usefully employed in the production of coloring-matters, of which the following is a specification.

The new carbonic-acid compound of the meta-amidophenol described hereinafter is obtained by treating the meta-amidophenol in presence of alkalies or alkaline earths with carbonic acid at a high temperature. The action of the carbonic acid is best obtained in an aqueous alkaline solution.

Example of proceeding: Ten kilos of meta-amidophenol,

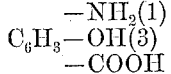

forty kilos of carbonate of ammonium, and fifty kilos of water are heated in an autoclave during twelve hours up to 110° centigrade. Instead of carbonate of ammonium, a proportional quantity of bicarbonate of potassium or of bicarbonate of soda may be used. The contents of the autoclave are then evaporated to about thirty kilograms, whereby most of the excess of carbonate of ammonium escapes. By the cautious addition of muriatic acid the impurities separate out in brown flakes. After filtering the filtrate is precipitated by addition of muriatic acid. Thus the hydrochloride of the carbonic-acid compound of meta-amidophenol crystallizes out in short flat needles. It is purified by dissolving it in soda, filtering the solution, and precipitating again with muriatic acid. When the alkaline solution is precipitated with diluted sulphuric acid, the sulphate is separated. The sulphate is still more difficultly soluble than the hydrochloride. From the hydrochloride the free carbonic-acid compound of the amidophenol is obtained by addition of the necessary quantity of an alkali or of acetate of lime and by agitating with ether. After distillation of the ether the carbonic-acid compound of the meta-amidophenol remains in the form of small white needles, which, after repeated recrystallization from ether, melt at 148° centigrade and are decomposed into carbonic anhydride and meta-amidophenol. The carbonic-acid compound of meta-amidophenol is easily soluble in water, alcohol, and ether, difficultly soluble in benzol, toluol, and chloroform. The alkaline salts are easily soluble in water, but the hydrochloride and the sulphate are difficultly soluble. When the acid or its salts are heated in an aqueous solution, a decomposition takes place, separating out carbonic anhydride.

The above-described carbonic-acid compound of the meta-amidophenol can be used for the production of coloring-matters.

What we claim as new and original, and desire to secure by Letters Patent, is—

The carbonic-acid compound of the meta-amidophenol, crystallizing in small white needles, melting at 148° centigrade under decomposition, easily soluble in water, alcohol, and ether, difficultly soluble in benzol.

In testimony whereof we have hereunto set our hands in the presence of two subscribing witnesses.

ROBERT GNEHM.
JAKOB SCHMID.

Witnesses:
GEORGE GIFFORD,
CHS. A. RICHTER.